F. J. HARRISON & W. J. KNOX.
HAND BRAKE WHEEL.
APPLICATION FILED NOV. 14, 1914.

1,139,676.

Patented May 18, 1915.

UNITED STATES PATENT OFFICE.

FREDERICK J. HARRISON AND WILLIAM J. KNOX, OF DUBOIS, PENNSYLVANIA.

HAND-BRAKE WHEEL.

1,139,676.     Specification of Letters Patent.     Patented May 18, 1915.

Application filed November 14, 1914. Serial No. 872,081.

*To all whom it may concern:*

Be it known that we, FREDERICK J. HARRISON and WILLIAM J. KNOX, both citizens of the United States, residing at Dubois, Clearfield county, Pennsylvania, have invented certain new and useful Improvements in Hand-Brake Wheels, of which the following is a specification.

The invention relates to hand brake wheels, and has for its objects the provision of an improved type of wheel which can be used either with the standard round brake shaft or with a brake shaft angular in cross section such as that shown in our copending application, Serial No. 757,150, filed March 27th, 1913, thus reducing the number of different forms of wheel which must be carried in stock in those cases in which a concern uses both types of brake shaft. One embodiment of the invention is illustrated in the accompanying drawings wherein—

Figure 1:
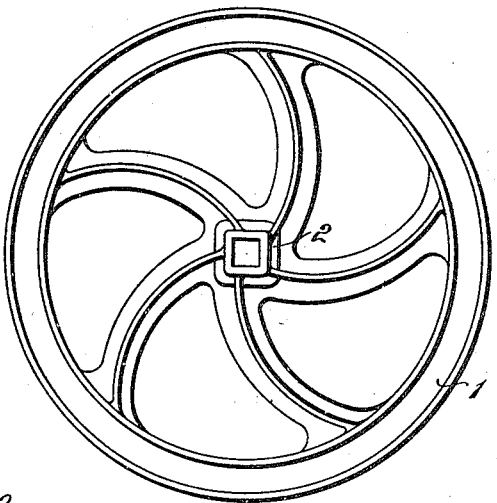
Figure 2:
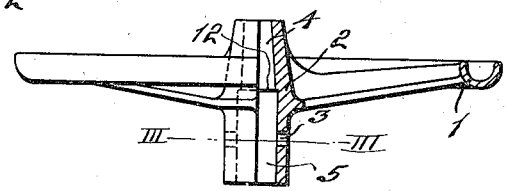
Figure 3:
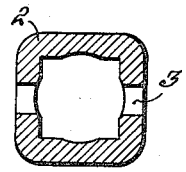
Figure 4:
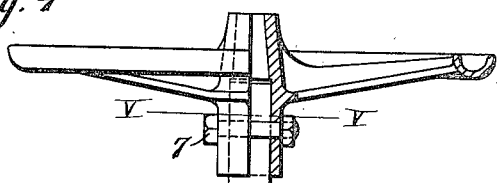
Figure 5:
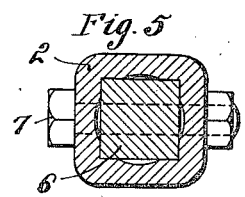
Figure 6:
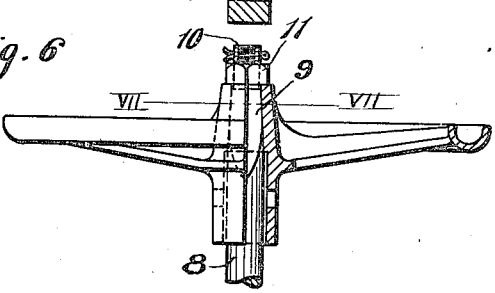
Figure 7:
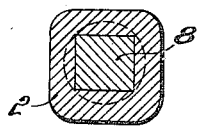

Figure 1 is a plan view of the wheel, Fig. 2 is a partial side elevation and partial section of the wheel, Fig. 3 is a section on the line III—III of Fig. 2, Fig. 4 is a partial side elevation and partial section of the wheel as applied to the upper end of a square brake shaft, Fig. 5 is a section on the line V—V of Fig. 4, Fig. 6 is a partial side elevation and partial section of the wheel as applied to the upper end of a standard round brake shaft, and Fig. 7 is a section on the line VII—VII of Fig. 6.

Referring to Figs. 1, 2 and 3, 1 is the rim of the wheel which may be of any desired type, and 2 is the hub which hub is provided with a transverse perforation 3. The hub 2 is provided with a brake shaft receiving perforation, the upper part 4 of which is tapering and square in cross section as will be seen by reference to Figs. 2 and 7, and the lower part 5 of which is untapered and square in cross section as indicated in Fig. 3.

Figs. 4 and 5 illustrate the use of the wheel with a square brake shaft 6 which fits the untapered portion 5 of the hub and is held in position by means of the transverse bolt 7.

Figs. 6 and 7 illustrate the use of the wheel with the standard round brake shaft 8. This brake shaft is tapered and square at its upper end as indicated at 9, and fits the part 4 (Fig. 2) of the perforation through the hub. The extreme upper end of the brake shaft 8 is threaded at 10 and the wheel is held against movement with respect to the brake shaft by means of the nut 11.

It will be seen that the one wheel may be used equally well with the standard round brake shaft having the squared and tapered upper end or with a square brake shaft of the type illustrated in the application heretofore referred to. The number of parts which a road must carry in stock where both types of brake shaft are employed is reduced, and the cost of the wheel is practically no greater than that of the ordinary brake wheel. It will be noted that the tapering portion 4 acts as a stop for the end of the square brake shaft 6 when such type of shaft is employed, and if desired a slight shoulder 12 may be formed at the intersection of the two parts of the hub, the end of the square brake shaft taking against such shoulder.

By reference to Figs. 3 and 5 it will be seen that each of the side walls of the lower part of the perforation is recessed on a curve as indicated at 13. This arrangement not only permits of the use of a round brake shaft, approximating in cross-sectional area that of the square brake shaft, but also permits of the "drifting" of this portion of the perforation to the necessary size in case the square brake shaft does not fit the perforation. Any difficulty as to fitting, of course, occurs at the corners, and with the metal removed intermediate the corners it is comparatively easy to drive in a drifting member and crowd the metal in the corners to a position such that the end of the brake shaft will be properly positioned. The construction has the further advantage that the curved portions 13 serve as a better support for the round brake shaft than would be the case if the sides were plain. Furthermore, if the squaring of the upper end of the round brake shaft is not exactly true with respect to the axis of the shaft, the clearance as provided by the recesses 13 permits the shaft to be more readily forced into its extreme upper position

What we claim is:

1. In combination, a brake wheel comprising a rim and a hub portion, the said hub portion having a shaft receiving perforation with its upper portion tapering and angular in cross section to fit the upper tapered and angular end of a round brake shaft, and with its lower portion of uniform angular cross section to fit the upper end of a brake shaft angular in cross section, each of the side walls of the said lower portion being recessed on a curve intermediate the corners of said lower portion.

2. In combination, a brake wheel comprising a rim and a hub portion, the said hub portion having a shaft receiving perforation with one part tapered and square in cross section to fit the tapered and squared end of a round brake shaft, and with another part untapered and of square cross section to fit the end of a brake shaft square in cross section, the portion of the hub having the untapered part of the perforation being transversely perforated to receive a member for holding the wheel against upward movement, and a shoulder being provided at the intersection of the two parts of the said perforation.

In testimony whereof we have hereunto signed our names in the presence of the two subscribed witnesses.

F. J. HARRISON.
WM. J. KNOX.

Witnesses:
HARRY T. SMITH,
W. I. FINCH.